(12) United States Patent
Tang

(10) Patent No.: US 11,483,695 B2
(45) Date of Patent: Oct. 25, 2022

(54) WIRELESS COMMUNICATION METHOD AND TERMINAL DEVICE FOR NEW RADIO COMMUNICATION SYSTEM

(71) Applicant: Guangdong OPPO Mobile Telecommunications Corp., Ltd., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/752,377

(22) Filed: Jan. 24, 2020

(65) Prior Publication Data

US 2020/0162886 A1     May 21, 2020

Related U.S. Application Data

(63) Continuation of application No. PCT/CN2017/103919, filed on Sep. 28, 2017.

(51) Int. Cl.
*H04W 8/02*     (2009.01)
*H04W 24/02*    (2009.01)
*H04W 76/15*    (2018.01)

(52) U.S. Cl.
CPC .......... *H04W 8/02* (2013.01); *H04W 24/02* (2013.01); *H04W 76/15* (2018.02)

(58) Field of Classification Search
CPC ....... H04W 8/02; H04W 24/02; H04W 92/12; H04W 12/03; H04W 36/0069;
(Continued)

(56) References Cited

U.S. PATENT DOCUMENTS 9,603,075 B2     3/2017 Zhao et al.
2008/0119188 A1* 5/2008 Kuo .............................. 455/436
(Continued)

FOREIGN PATENT DOCUMENTS

CN    102026324 A    4/2011
CN    102158303 A    8/2011
(Continued)

OTHER PUBLICATIONS

Official Action issued in counterpart Russian Application No. 2020112505/07, dated Nov. 23, 2020, 11 pages.
(Continued)

*Primary Examiner* — Meless N Zewdu
(74) *Attorney, Agent, or Firm* — Bayes PLLC

(57) ABSTRACT

Embodiments of this application provide a wireless communication method and a terminal device, to flexibly judge, according to configuration information of a network device, whether a PDCP layer entity needs to re-established, thereby preventing a re-establishment operation from being performed when the PDCP layer entity does not need to be re-established, and then reducing signaling overheads. The method includes: receiving, by a terminal device, configuration information that is used to perform mobility management on the terminal device and that is sent by a network device, where the configuration information includes indication information, and the indication information is used to configure a packet data convergence protocol PDCP layer entity; and determining, by the terminal device according to the indication information, whether to re-establish the PDCP layer entity.

8 Claims, 6 Drawing Sheets

(58) Field of Classification Search
CPC .............. H04W 76/19; H04W 88/085; H04W 36/0055; H04W 76/15; H04W 74/08; H04W 4/50; H04W 88/00; H04W 88/02; H04W 88/08; H04W 88/06; H04W 92/10; H04W 92/02; H04W 92/00; H04W 88/18; H04W 80/02; H04W 80/00; H04W 80/12; H04W 12/106; H04W 28/06; H04W 28/065; H04W 76/00; H04W 76/20; H04W 76/16; H04W 8/08; H04W 48/16; H04W 12/04; H04W 8/24; H04W 8/20; H04W 8/22; H04W 8/245; H04W 12/0471; H04W 12/08; H04W 12/108; H04W 76/10; H04W 76/11; H04W 76/18; H04W 92/20; H04W 92/18; H04L 69/16; H04L 41/0823; H04L 41/0836; H04L 41/0866; H04L 41/0869; H04L 1/008; H04L 1/0083; H04L 69/08

See application file for complete search history.

(56) References Cited

U.S. PATENT DOCUMENTS

| | | | |
|---|---|---|---|
| 2009/0055638 A1* | 2/2009 | Nakano et al. | 713/1 |
| 2009/0175163 A1* | 7/2009 | Sammour et al. | 370/216 |
| 2009/0257399 A1* | 10/2009 | Kuo | 370/331 |
| 2012/0142361 A1 | 6/2012 | Zhao et al. | |
| 2013/0135987 A1 | 5/2013 | Wang et al. | |
| 2014/0071948 A1 | 3/2014 | Kim et al. | |
| 2014/0301188 A1 | 10/2014 | Koskinen | |
| 2015/0133135 A1* | 5/2015 | Zhang et al. | H04W 72/0406 |
| 2015/0271726 A1* | 9/2015 | Kim et al. | H04W 36/12 |
| 2016/0014647 A1 | 1/2016 | Yi et al. | |
| 2016/0021591 A1 | 1/2016 | Lin et al. | |
| 2016/0044639 A1 | 2/2016 | Yi et al. | |
| 2016/0337848 A1 | 11/2016 | Chang et al. | |
| 2017/0013668 A1 | 1/2017 | Chang et al. | |
| 2017/0215225 A1* | 7/2017 | Yi et al. | H04W 80/02 |
| 2018/0083688 A1* | 3/2018 | Agiwal et al. | H04B 7/0697 |
| 2018/0139030 A1* | 5/2018 | Kim et al. | H04L 5/0098 |
| 2018/0217942 A1* | 8/2018 | Fons et al. | G06F 12/1408 |
| 2019/0053098 A1* | 2/2019 | Jo et al. | |
| 2019/0380081 A1* | 12/2019 | Chang et al. | H04W 36/18 |
| 2020/0022083 A1* | 1/2020 | Jin et al. | H04W 52/0235 |
| 2020/0221526 A1* | 7/2020 | Jin et al. | H04W 76/19 |
| 2020/0374961 A1* | 11/2020 | Ingale et al. | H04W 76/20 |
| 2021/0058818 A1* | 2/2021 | Zhang et al. | H04W 28/0268 |

FOREIGN PATENT DOCUMENTS

| | | |
|---|---|---|
| CN | 102972088 A | 3/2013 |
| CN | 102026324 B | 1/2014 |
| CN | 103533586 A | 1/2014 |
| CN | 104519486 A | 4/2015 |
| CN | 104935413 A | 9/2015 |
| CN | 104955064 A | 9/2015 |
| CN | 105230077 A | 1/2016 |
| CN | 106304398 A | 1/2017 |
| CN | 107113287 A | 8/2017 |
| EP | 2480025 A1 | 7/2012 |
| EP | 3070975 A1 | 9/2016 |
| RU | 2622110 C2 | 6/2017 |
| WO | 2016021820 A1 | 2/2016 |
| WO | 2018030798 A1 | 2/2018 |
| WO | 2018203702 A1 | 11/2018 |
| WO | 2018228057 A1 | 12/2018 |

OTHER PUBLICATIONS

International Search Report, PCT/CN2017/103919, dated Jun. 20, 2018, 5 pages.
European Patent Application No. 17926720.8, "European search report", dated Jul. 7, 2020, 13 pages.
Nokia et al., "SDU delivery at PDCP re-establishment for UM bearers", 3GPP TSG-RAN WG2 #99 R2-1708686, Aug. 21-25, 2017, 2 pages, Berlin, Germany.
Samsumg, "Impact on control and user plane procedure due to intra and inter CU HO", 3GPP TSG-RAN WG2 2017 RAN2#99 Meeting R2-1708446, Aug. 21-25, 2017, 3 pages, Berlin, Germany.
Samsung, "Samsung Bearer handling in NR-E-UTRA Dal Connectivity", 36PP TSG-RAN 2017 RAN#99 Meeting R2-1708439, Aug. 21-25, 2017, 3 pages, Berlin, Germany.
Huawei et al., "Huawei Text proposal to TS 38.300 on NR handover without PDCP reset", 3GPP TSG-RAN2 WG2 Meeting #98 R2-1704851, May 15-19, 2017, 2 pages, Hangzhou, China.
Huawei et al., "L2 handling at bearer type change for LTE-NR DC", 36PP TSG-RAN WG2 Meeting #97bis R2-1703660, Apr. 3-7, 2017, 7 pages, Spokane, USA.
First Office action issued in corresponding Chinese Application No. 202010071281.5, dated Apr. 21, 2021, 15 pages.
First Office action issued in corresponding Canadian Application No. 3,075,835, dated Apr. 23, 2021, 4 pages.
Notice of Reasons for Refusal issued in corresponding Japanese Application No. 2020-514546, dated May 28, 2021, 6 pages.
Notification of Reason for Refusal issued in corresponding Korean Application No. 10-2020-7006953, dated Jul. 12, 2021, 10 pages.
Notification to Grant Patent Right for Invention issued in corresponding Chinese Application No. 202010071281.5, dated Jul. 14, 2021, 7 pages.
First Office action issued in corresponding India Application No. 202017016763, dated Jul. 20, 2021, 7 pages.
First Office action issued in corresponding Taiwan Application No. 107133979, dated Sep. 17, 2021, 8 pages.
First Office action issued in corresponding Singapore Application No. 11202002452S, dated Sep. 23, 2021, 11 pages.
Decision to Grant a Patent issued in corresponding Japanese Application No. 2020-514546, dated Jan. 14, 2022, 5 pages.
Second Office action issued in corresponding Canadian Application No. 3,075,835, dated Feb. 9, 2022, 4 pages.
Extended European Search Report issued in corresponding European Application No. 21212114.9, dated Mar. 16, 2022, 15 pages.
Decision of Rejection issued in corresponding Taiwanese Application No. 107133979, dated Mar. 16, 2022, 8 pages.

* cited by examiner

WIRELESS COMMUNICATION METHOD AND TERMINAL DEVICE FOR NEW RADIO COMMUNICATION SYSTEM

CROSS-REFERENCES TO RELATED APPLICATIONS

This application is a continuation of and claims priority to International Patent Application PCT/CN2017/103919, filed Sep. 28, 2017, the contents of which is hereby incorporated by reference in its entirety.

BACKGROUND OF THE INVENTION

Technical Field

This application relates to the field of communications, and more specifically, to a wireless communication method and a terminal device.

Related Art

In a long term evolution (LTE) communications system, when a terminal device is moving or a network node accessed by a terminal device is changed (for example, a network node accessed by a terminal device is changed from a master node (MN) 1 to an MN 2, or is changed from a slave node (SN) 1 to an SN 2), a physical location of a packet data convergence protocol (PDCP) layer entity is changed. Therefore, the PDCP layer entity needs to be re-established.

In a 5G new radio (NR) communications system, a PDCP layer entity may be arranged in the cloud, that is, different network nodes may have the same PDCP layer entity. Therefore, a mechanism of re-establishing a PDCP layer entity in the existing LTE system cannot satisfy requirements of the 5G system.

SUMMARY OF THE INVENTION

Embodiments of this application provide a wireless communication method and a terminal device, to flexibly judge, according to configuration information of a network device, whether a PDCP layer entity needs to re-established, thereby preventing a re-establishment operation from being performed when the PDCP layer entity does not need to be re-established, and then reducing signaling overheads.

According to a first aspect, an embodiment of this application provides a wireless communication method, including: receiving, by a terminal device, configuration information that is used to perform mobility management on the terminal device and that is sent by a network device, where the configuration information includes indication information, and the indication information is used to configure a packet data convergence protocol PDCP layer entity; and determining, by the terminal device according to the indication information, whether to re-establish the PDCP layer entity.

Therefore, in the wireless communication method of this embodiment of this application, the terminal device determines, according to the indication information that is used to configure the PDCP layer entity and that is sent by the network device, whether to re-establish the PDCP layer entity. Therefore, the terminal device performs a re-establishment operation when the PDCP layer entity needs to be re-established, and performs no re-establishment operation when the PDCP layer entity does not need to be re-established, so as to avoid signaling overheads caused because the re-establishment operation is performed when the PDCP layer entity does not need to be re-established.

Optionally, in an implementation of the first aspect, the indication information is key information; and the determining, by the terminal device according to the indication information, whether to re-establish the PDCP layer entity includes: re-establishing, by the terminal device, the PDCP layer entity when it is determined that the key information of the current PDCP layer entity is changed.

Therefore, in the wireless communication method of this embodiment of this application, the network device may implicitly instruct, through the key information, to re-establish the PDCP layer entity.

Optionally, in an implementation of the first aspect, the indication information is key information; and the determining, by the terminal device according to the indication information, whether to re-establish the PDCP layer entity includes: skipping re-establishing, by the terminal device, the PDCP layer entity when it is determined that the key information of the current PDCP layer entity is kept unchanged.

Therefore, in the wireless communication method of this embodiment of this application, the network device may implicitly instruct, through the key information, to skip re-establishing the PDCP layer entity.

Optionally, in an implementation of the first aspect, when some or all network nodes accessed by the terminal device are changed, the terminal device receives the configuration information sent by the network device.

Therefore, in the wireless communication method of this embodiment of this application, when some or all network nodes accessed by the terminal device are changed, the network device configures the indication information, thereby instructing the terminal device to determine whether to re-establish the PDCP layer entity.

Optionally, in an implementation of the first aspect, the method further includes: determining, by the terminal device when the terminal device re-establishes the PDCP layer entity according to the indication information, that a compression algorithm needs to be reset.

Optionally, in an implementation of the first aspect, the method further includes: determining, by the terminal device when the terminal device re-establishes the PDCP layer entity according to the indication information, that a ciphering and deciphering algorithm needs to be reconfigured.

Optionally, in an implementation of the first aspect, the method further includes: determining, by the terminal device when the terminal device re-establishes the PDCP layer entity according to the indication information, that a process variable needs to be reset.

According to a second aspect, an embodiment of this application provides a terminal device, including modules or units that can perform the method according to the first aspect or any optional implementation of the first aspect.

A third aspect provides a terminal device, and the terminal device includes: a processor, a memory, and a communications interface. The processor is connected to the memory and the communications interface. The memory is configured to store an instruction, the processor is configured to execute the instruction, and the communications interface is configured to communicate with another network element under the control of the processor. When the processor executes the instruction stored in the memory, the execution enables the processor to perform the method according to the first aspect or any possible implementation of the first aspect.

A fourth aspect provides a computer storage medium, the computer storage medium stores program code, and the program code is used to instruct a computer to perform the method according to the first aspect or any possible implementation of the first aspect.

A fifth aspect provides a computer program product including an instruction, and when the computer program product is run on a computer, the computer is enabled to perform the method according to each of the foregoing aspects.

DETAILED DESCRIPTION OF THE INVENTION

The technical solutions in the embodiments of this application are described clearly with reference to the accompanying drawings in the embodiments of this application below.

The technical solutions of the embodiments of this application may be applied to a dual connectivity (DC) communications system such as an LTE and 5G NR dual connectivity communications system, or may be applied to an NR communications system.

Figure 1:
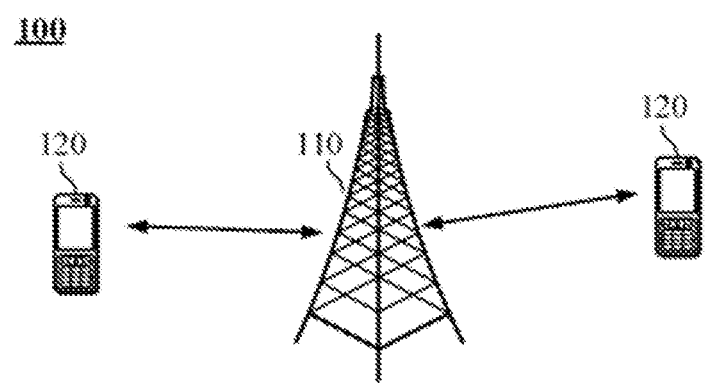
FIG. 1 shows a wireless communications system to which an embodiment of this application is applied.

FIG. 1 shows a wireless communications system 100 to which an embodiment of this application is applied. The wireless communications system 100 may include a network device 110. The network device 110 may be a device communicating with a terminal device. The network device 110 may provide communications coverage to a particular geographic area, and may communicate with a terminal device (for example, UE) located within the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN) or the like.

The wireless communications system 100 further includes at least one terminal device 120 located within the coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

FIG. 1 shows one base station, one core network device, and two terminal devices as an example. Optionally, the wireless communications system 100 may include a plurality of base station devices and coverage of each base station may include another quantity of terminal devices. This is not limited in this embodiment of this application.

Optionally, the wireless communications system 100 may further include other network entities such as a session management function (SMF), a unified data management (UDM) function, and an authentication server function (AUSF). This is not limited in this embodiment of this application.

Figure 2:
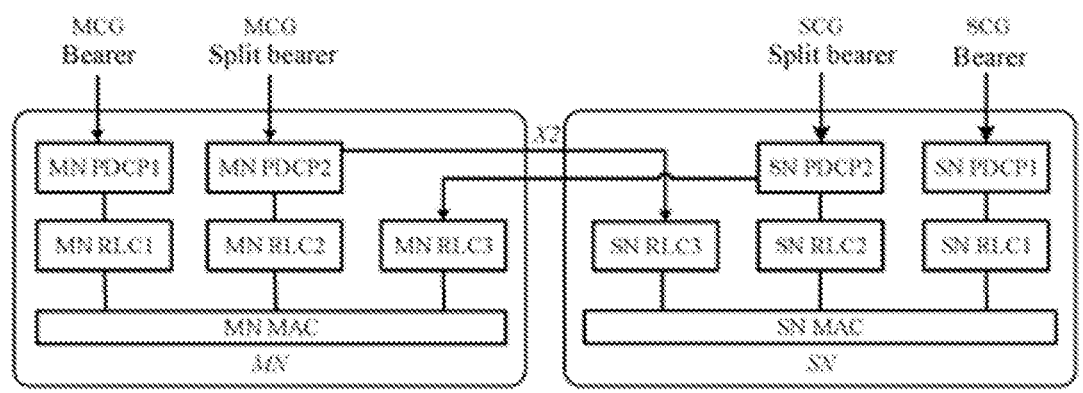
FIG. 2 is a schematic diagram of a dual connectivity system architecture to which an embodiment of this application is applied.

FIG. 2 is a schematic diagram of a dual connectivity system architecture to which an embodiment of this application is applied. As shown in FIG. 2, a terminal device may be simultaneously connected to two different communications systems. In FIG. 2, description is made by using an example in which the terminal device is simultaneously connected to LTE and NR. An MN node of the terminal device is an LTE communications node, and may access a network node supporting LTE communication, or may access a network node supporting NR communication; and an SN node of the terminal device is an NR communications node, and may access a network node supporting LTE communication, or may access a network node supporting NR communication.

Optionally, the MN node may be an NR communications node, and may access a network node supporting LTE communication, or may access a network node supporting NR communication; and the SN node of the terminal device may be an LTE communications node, and may access a network node supporting LTE communication, or may access a network node supporting NR communication.

As shown in FIG. 2, the terminal device may keep a master cell group (MCG) bearer and an MCG split bearer at the MN node, and keep a slave cell group (SCG) bearer and an SCG split bearer at the SN node. The MCG bearer is connected to an MN PDCP 1, an MN radio link control (RLC) 1, and an MN media access control (MAC), the MCG split bearer is connected to an MN PDCP 2, an MN RLC 2, and the MN MAC, the MCG split bearer is further connected to the MN PDCP 2, an SN RLC 3, and an SN MAC, and the MN PDCP 2 and the SN RLC 3 are connected to each other through an X2 interface. The SCG bearer is connected to an SN PDCP 1, an SN RLC 1, and the SN MAC, the SCG split bearer is connected to an SN PDCP 2, an SN RLC 2, and the SN MAC, the SCG split bearer is further connected to the SN PDCP 2, an MN RLC 3, and the MN MAC, and the SN PDCP 2 and the MN RLC 3 are connected to each other through the X2 interface.

It should be understood that, in FIG. 2, the MN PDCP 1 and the MN PDCP 2 are differentiated between each other only for convenience of description, and are unnecessarily differentiated between each other as shown in FIG. 2 during actual deployment, which is similar for the MN RLC 1, the MN RLC 2, and the MN RLC 3, similar for the SN PDCP 1 and the SN PDCP 2, and similar for the SN RLC 1, the SN RLC 2, and the SN RLC 3.

Optionally, in this embodiment of this application, in a network device accessed by the terminal device, a central unit (CU) and a distributed unit (DU) may be separated. Due to separation of the CU and the DU, an RLC layer/MAC layer/physical (PHY) layer entity and a PDCP layer entity are separately deployed. To be specific, for the RLC layer/MAC layer/PHY layer entity, different network nodes have different entities; and for the PDCP layer entity, different network nodes may have a same entity, and this the PDCP layer entity is deployed in the cloud (a side close to a server). When the MN and/or the SN accessed by the terminal device is changed (for example, the MN is changed from an MN 1 to an MN 2, or the SN is changed from an SN 1 to an SN 2), a physical location of the PDCP layer entity is not changed, and the PDCP layer entity does not need to be re-established; and a physical location of the RLC layer/MAC layer/PHY layer entity is changed, and the RLC layer/MAC layer/PHY layer entity needs to re-established.

A wireless communication method provided in the embodiments of this application may be applied to a terminal device, and the terminal device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems for implementing service processing through a process, for example, a Linux operating system, a Unix operating system, an Android operating system, an iOS operating system or a Windows operating system. The application layer includes applications such as a browser, an address book, word processing software, and instant messaging software.

In addition, aspects or features of this application may be implemented as a method, an apparatus or a product that uses standard programming and/or engineering technologies. The term "product" used in this application covers a computer program that can be accessed from any computer-readable device, carrier or medium. For example, a computer-readable medium may include, but is not limited to: a magnetic storage device (such as a hard disk, a floppy disk, or a magnetic tape), an optical disc (such as a compact disk (CD), or a digital versatile disc (DVD)), a smartcard and a flash memory device (such as an erasable programmable read-only memory (EPROM), a card, a stick, or a key drive). In addition, various storage media described in this specification may indicate one or more devices and/or other machine-readable media that are used to store information. The term "machine-readable media" may include but is not limited to various media that can store, contain, and/or carry an instruction and/or data.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 3:
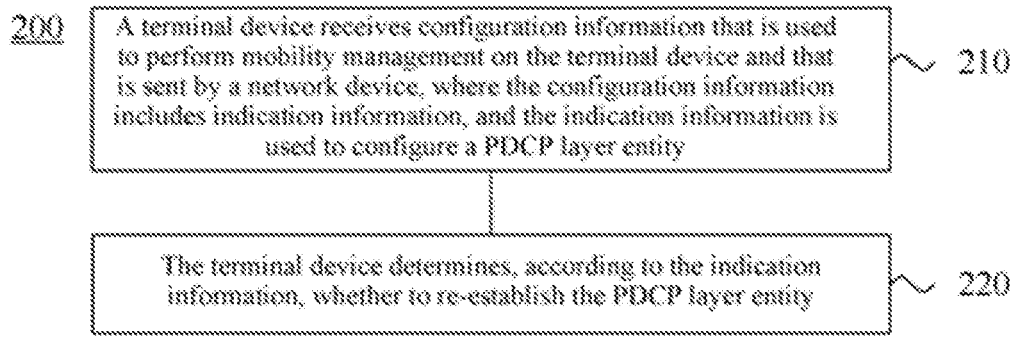
FIG. 3 is a schematic flowchart of a wireless communication method according to an embodiment of this application.

FIG. 3 is a schematic flowchart of a wireless communication method 200 according to an embodiment of this application. As shown in FIG. 3, the method 200 may be performed by a terminal device, the terminal device may be the terminal device shown in FIG. 1, and the terminal device may be applied to the dual connectivity system architecture shown in FIG. 2. A network device in the method 200 may be the network device shown in FIG. 1, the network device may implement separation of a CU and a DU, and the network device may communicate with the terminal device having the dual connectivity system architecture and shown in FIG. 2. The method 200 includes the following content.

210. A terminal device receives configuration information that is used to perform mobility management on the terminal device and that is sent by a network device, where the configuration information includes indication information, and the indication information is used to configure a PDCP layer entity.

Optionally, the network device may send the configuration information to the terminal device in advance, or may send the configuration information to the terminal device when a location of the terminal device is moving.

Optionally, the network device may explicitly indicate whether the terminal device re-establishes the PDCP layer entity. Optionally, the indication information may directly indicate whether the terminal device re-establishes the PDCP layer entity. For example, the indication information may be a flag bit. When a value of the flag bit is 0, it indicates that the terminal device re-establishes the PDCP layer entity; or when a value of the flag bit is 1, it indicates that the terminal device skips re-establishing the PDCP layer entity.

Optionally, the network device may implicitly indicate whether the terminal device re-establishes the PDCP layer entity.

Optionally, the indication information is key information, and the terminal device re-establishes the PDCP layer entity when it is determined that the key information of the current PDCP layer entity is changed; or the terminal device skips re-establishing the PDCP layer entity when it is determined that the key information of the current PDCP layer entity is kept unchanged.

It should be understood that, unique key information is configured for each PDCP layer entity.

Optionally, when some or all network nodes accessed by the terminal device are changed, the terminal device receives the configuration information sent by the network device.

Optionally, the network device may be a network device in which a network node after change is located, that is, a network device in which a re-accessing network node is located.

For example, when the SN node accessed by the terminal device is changed (switched from the SN 1 to the SN 2), the terminal device receives the configuration information sent by the network device, and determines, according to the indication information in the configuration information, whether to re-establish the PDCP layer entity.

If the PDCP layer entity of the SCG bearer corresponding to the SN 2 is deployed in the cloud, the physical location of the PDCP layer entity is not changed. In this case, the terminal device skips re-establishing the PDCP layer entity.

If the PDCP layer entity of the SCG bearer corresponding to the SN 2 is not deployed in the cloud, the physical location of the PDCP layer entity is changed. In this case, the terminal device needs to re-establish the PDCP layer entity.

For another example, when the SN accessed by the terminal device is changed (switched from the SN 1 to the SN 2), the terminal device receives the configuration information sent by the network device, and determines, according to the indication information in the configuration information, whether to re-establish the PDCP layer entity.

If the PDCP layer entity of the SCG bearer corresponding to the SN 2 is deployed on an MN side, a used key is a key for an MN PDCP. In this case, although the SN is changed, the physical location of the PDCP layer entity thereof is not changed. In this case, the terminal device skips re-establishing the PDCP layer entity.

Optionally, all network nodes accessed by the terminal device may alternatively be changed. In this case, whether to re-establish the PDCP layer entity may be determined by determining whether the key information is changed.

220. The terminal device determines, according to the indication information, whether to re-establish the PDCP layer entity.

Optionally, the terminal device determines, when the terminal device re-establishes the PDCP layer entity according to the indication information, that a compression algorithm needs to be reset.

Optionally, the terminal device determines, when the terminal device re-establishes the PDCP layer entity according to the indication information, that a ciphering and deciphering algorithm needs to be reconfigured.

Optionally, the terminal device determines, when the terminal device re-establishes the PDCP layer entity according to the indication information, that a process variable needs to be reset.

Optionally, when the PDCP layer entity is re-established, the terminal device determines that at least one operation of resetting a compression algorithm, reconfiguring a ciphering and deciphering algorithm, and resetting a process variable needs to be performed.

Optionally, when the PDCP layer entity is re-established, and the terminal device determines that resetting of a compression algorithm, reconfiguration of a ciphering and deciphering algorithm, and resetting of a process variable need to be simultaneously performed, resetting of the compression algorithm, reconfiguration of the ciphering and deciphering algorithm, and resetting of the process variable are not performed in order. To be specific, the terminal device may first reset the compression algorithm, may first reconfigure the ciphering and deciphering algorithm, or may first reset the process variable. This is not limited in this embodiment of this application.

Optionally, when the PDCP layer entity is re-established, and the terminal device determines that any two operations of resetting the compression algorithm, reconfiguring the ciphering and deciphering algorithm, and resetting the process variable need to be simultaneously performed, the any two operations are not performed in order either.

Therefore, in the wireless communication method of this embodiment of this application, the terminal device determines, according to the indication information that is used to configure the PDCP layer entity and that is sent by the network device, whether to re-establish the PDCP layer entity. Therefore, the terminal device performs a re-establishment operation when the PDCP layer entity needs to be re-established, and performs no re-establishment operation when the PDCP layer entity does not need to be re-established, so as to avoid signaling overheads caused because the re-establishment operation is performed when the PDCP layer entity does not need to be re-established.

Further, when some or all network nodes accessed by the terminal device are changed, the network device configures the indication information, thereby instructing the terminal device to determine whether to re-establish the PDCP layer entity.

Figure 4:
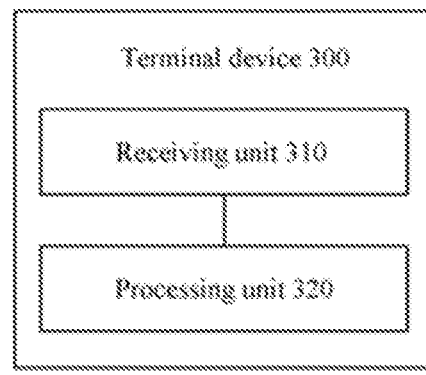
FIG. 4 is a schematic block diagram of a terminal device according to an embodiment of this application.

FIG. 4 is a schematic block diagram of a terminal device 300 according to an embodiment of this application. As shown in FIG. 4, the terminal device 300 includes: a receiving unit 310, configured to receive configuration information that is used to perform mobility management on the terminal device and that is sent by a network device, where the configuration information includes indication information, and the indication information is used to configure a packet data convergence protocol PDCP layer entity; and a processing unit 320, configured to determine, according to the indication information, whether to re-establish the PDCP layer entity.

Optionally, the indication information is key information; and the processing unit 320 is specifically configured to: re-establish the PDCP layer entity when it is determined that the key information of the current PDCP layer entity is changed.

Optionally, the indication information is key information; and the processing unit 320 is specifically configured to: skip re-establishing the PDCP layer entity when it is determined that the key information of the current PDCP layer entity is kept unchanged.

Optionally, when some or all network nodes accessed by the terminal device are changed, the receiving unit 310 receives the configuration information sent by the network device.

Optionally, the processing unit 320 is further configured to determine, when re-establishing the PDCP layer entity according to the indication information, that a compression algorithm needs to be reset.

Optionally, the processing unit 320 is further configured to determine, when re-establishing the PDCP layer entity according to the indication information, that a ciphering and deciphering algorithm needs to be reconfigured.

Optionally, the processing unit 320 is further configured to determine, when re-establishing the PDCP layer entity according to the indication information, that a process variable needs to be reset.

It should be understood that, the terminal device 300 according to this embodiment of this application may correspond to the terminal device in the method 200 of this application, and the foregoing and other operations and/or functions of units in the terminal device 300 are respectively used to implement corresponding procedures of the terminal device in the method 200 shown in FIG. 3. For brevity, details are not described herein again.

Figure 5:
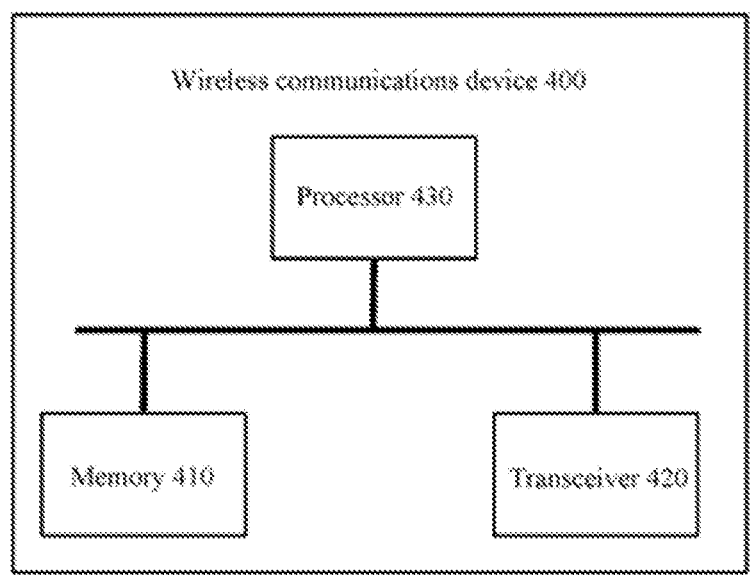
FIG. 5 is a schematic block diagram of a wireless communications device according to an embodiment of this application.

FIG. 5 is a schematic block diagram of a wireless communications device 400 according to an embodiment of this application. The device 400 includes: a memory 410, configured to store a program, where the program includes code; a transceiver 420, configured to communicate with another device; and a processor 430, configured to execute the program code in the memory 410.

Optionally, when the code is executed, the processor 430 may implement each operation performed by the terminal device in the method 200 in FIG. 3. For brevity, details are not described herein again. In this case, the device 400 may be a terminal device (for example, a mobile phone). The transceiver 420 is configured to perform specific signal receiving/transmission under driving of the processor 430.

It should be understood that, in this embodiment of this application, the processor 430 may be a central processing unit (CPU), or the processor 430 may be another general purpose processor, a digital signal processor (DSP), an application-specific integrated circuit (ASIC), a field programmable gate array (FPGA), or another programmable logical device, discrete gate or transistor logical device, or discrete hardware component, or the like. The general purpose processor may be a microprocessor or the processor may be any conventional processor and the like.

The memory 410 may include a read-only memory and a random access memory, and provide an instruction and data to the processor 430. A part of the memory 410 may further include a non-volatile random access memory. For example, the memory 410 may further store information about a device type.

The transceiver 420 may be configured to implement signal transmission and receiving functions, for example, frequency modulation and demodulation functions or up-conversion and down-conversion functions.

During implementation, at least one step of the foregoing method may be completed through an integrated logic circuit of hardware in the processor 430, or the integrated logic circuit may complete the at least one step under driving of an instruction in a software form. Therefore, the wireless communications device 400 may be a chip or chip set. Steps of the methods disclosed with reference to the embodiments of this application may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor 430 reads information in the memory and completes the steps in the foregoing methods in combination with hardware of the processor. To avoid repetition, details are not described herein again.

Figure 6:
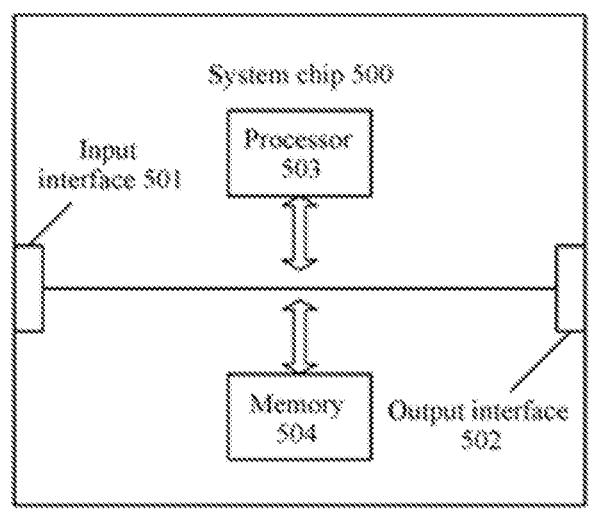
FIG. 6 is a schematic structural diagram of a system chip according to an embodiment of this application.

FIG. 6 is a schematic structural diagram of a system chip 500 according to an embodiment of this application. The system chip 500 in FIG. 6 includes an input interface 501, an output interface 502, a processor 503 and a memory 504 that may be connected to each other by using an internal communications connection line, and the processor 503 is configured to execute code in the memory 504.

Optionally, when the code is executed, the processor 503 implements the method performed by the terminal device in the method embodiment. For brevity, details are not described herein again.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   receiving, by a terminal device, configuration information that is used to perform mobility management on the terminal device and that is sent by a network device, wherein the configuration information comprises indication information, and the indication information is used to configure a packet data convergence protocol (PDCP) layer entity, wherein the indication information indicates whether key information of the PDCP layer entity is changed; and
   determining, by the terminal device according to the indication information, whether to re-establish the PDCP layer entity,
   wherein the determining whether to re-establish the PDCP layer entity, comprises:
   re-establishing, by the terminal device, the PDCP layer entity when the key information of the PDCP layer entity is changed;
   wherein the method further comprises:
   determining, by the terminal device when the terminal device re-establishes the PDCP layer entity, that a compression algorithm needs to be reset, that a ciphering and deciphering algorithm needs to be reconfirm, and that a process variable needs to be reset.

2. The method of claim 1 wherein:
the determining whether to re-establish the PDCP layer entity, comprises:
skipping re-establishing, by the terminal device, the PDCP layer entity when it is determined that the key information of the PDCP layer entity is kept unchanged.

3. The method of claim 1 wherein when some or all network nodes accessed by the terminal device are changed, the terminal device receives the configuration information sent by the network device.

4. A terminal device, comprising:
a transceiver, configured to receive configuration information that is used to perform mobility management on the terminal device and that is sent by a network device, wherein the configuration information comprises indication information, and the indication information is used to configure a packet data convergence protocol PDCP layer entity, wherein the indication information indicates whether key information of the PDCP layer entity is changed; and
a processor, configured to:
determine, according to the indication information, whether to re-establish the PDCP layer entity; and
re-establish the PDCP layer entity when it is determined that the key information of the PDCP layer entity is changed;
wherein the processor is further configured to:
determine, when re-establishing the PDCP layer entity, that a compression algorithm needs to be reset, that a ciphering and deciphering algorithm needs to be reconfigured, and that a process variable needs to be reset.

5. The terminal device of claim 4 wherein the processor is specifically configured to:
skip re-establishing the PDCP layer entity when it is determined that the key information of the PDCP layer entity is kept unchanged.

6. The terminal device of claim 4 wherein when some or all network nodes accessed by the terminal device are changed, the transceiver receives the configuration information sent by the network device.

7. A computer system, comprises:
one or more processors; and
one or more memories storing computer-readable instructions that, upon execution by the one or more processors, configure the computer system to:
receive, by a terminal device, configuration information that is used to perform mobility management on the terminal device and that is sent by a network device, wherein the configuration information comprises indication information, and the indication information is used to configure a packet data convergence protocol (PDCP) layer entity, wherein the indication information indicates whether key information of the PDCP layer entity is changed; and
determine, by the terminal device according to the indication information, whether to re-establish the PDCP layer entity,
wherein the determining, by the terminal device according to the key information, whether to re-establish the PDCP layer entity, comprises:
re-establishing, by the terminal device, the PDCP layer entity when determined that the key information of the PDCP layer entity is changed;
wherein the computer-readable instructions further configure the computer system to:
determine, by the terminal device when the terminal device re-establishes the PDCP layer entity, that a compression algorithm needs to be reset, that a ciphering and deciphering algorithm needs to be reconfigured, and that a process variable needs to be reset.

8. The computer system of claim 7
wherein the determining whether to re-establish the PDCP layer entity comprises:
skipping re-establishing, by the terminal device, the PDCP layer entity when it is determined that the key information of the PDCP layer entity is kept unchanged.

* * * * *